Nov. 28, 1944.  S. DECKER  2,363,503
CONFECTION STICK
Filed Dec. 21, 1939  7 Sheets-Sheet 1
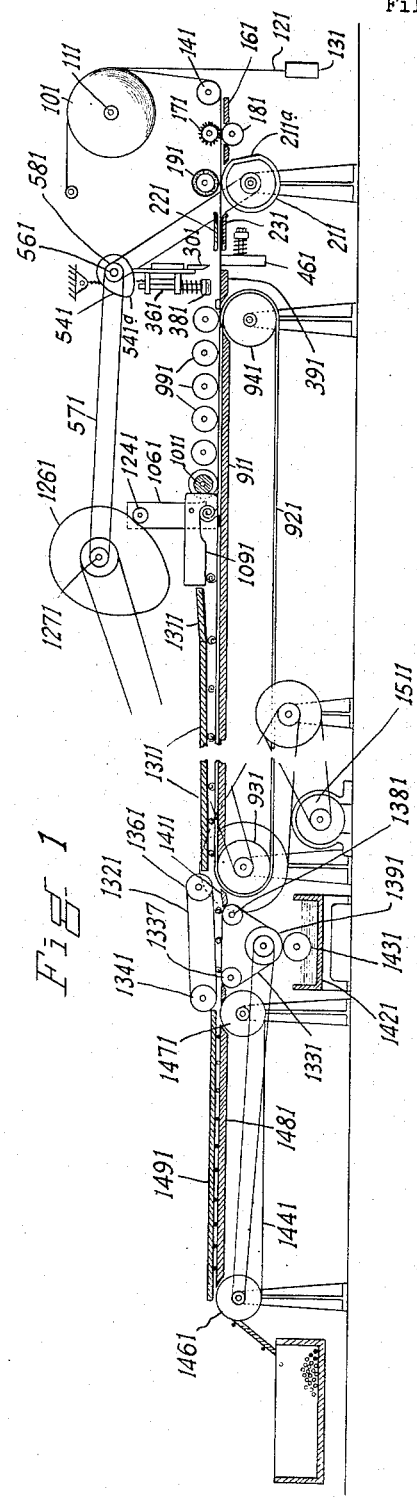
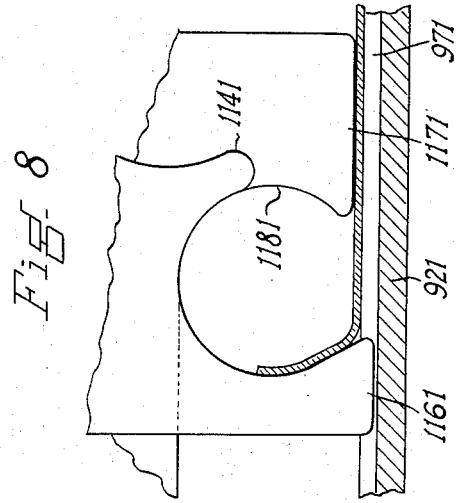
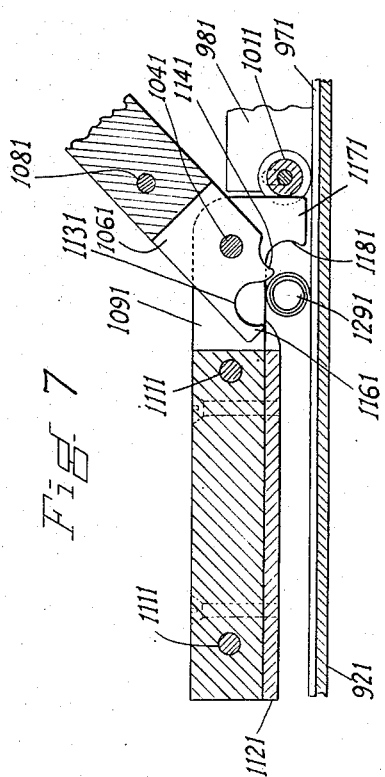
INVENTOR.
Sol Decker
BY
W. M. Holbrook ATTORNEY.

Nov. 28, 1944.   S. DECKER   2,363,503
CONFECTION STICK
Filed Dec. 21, 1939   7 Sheets-Sheet 2
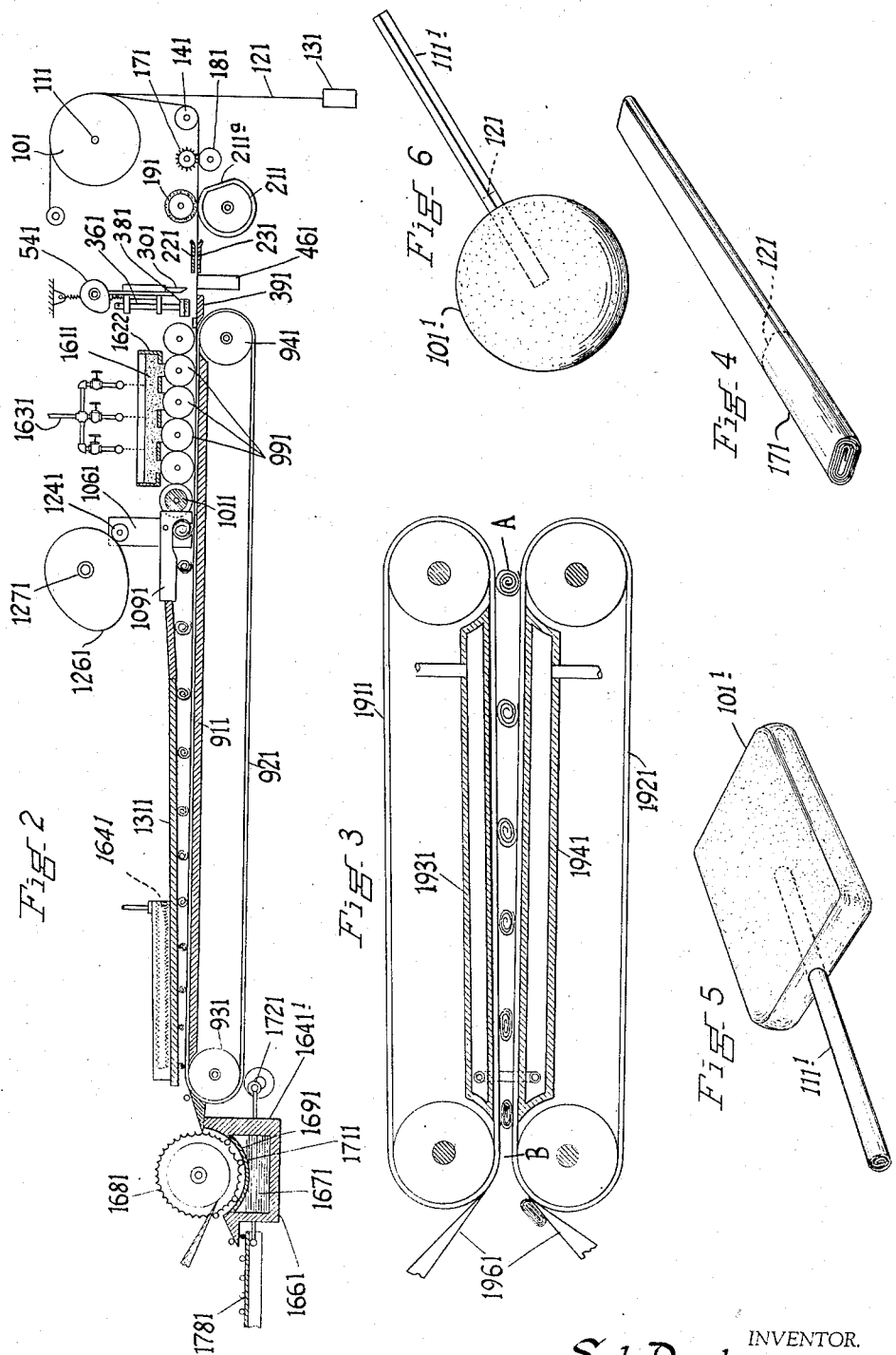
INVENTOR.
Sol Decker
BY
W. H. Holbrook   ATTORNEY.

Nov. 28, 1944.  S. DECKER  2,363,503
CONFECTION STICK
Filed Dec. 21, 1939  7 Sheets-Sheet 3
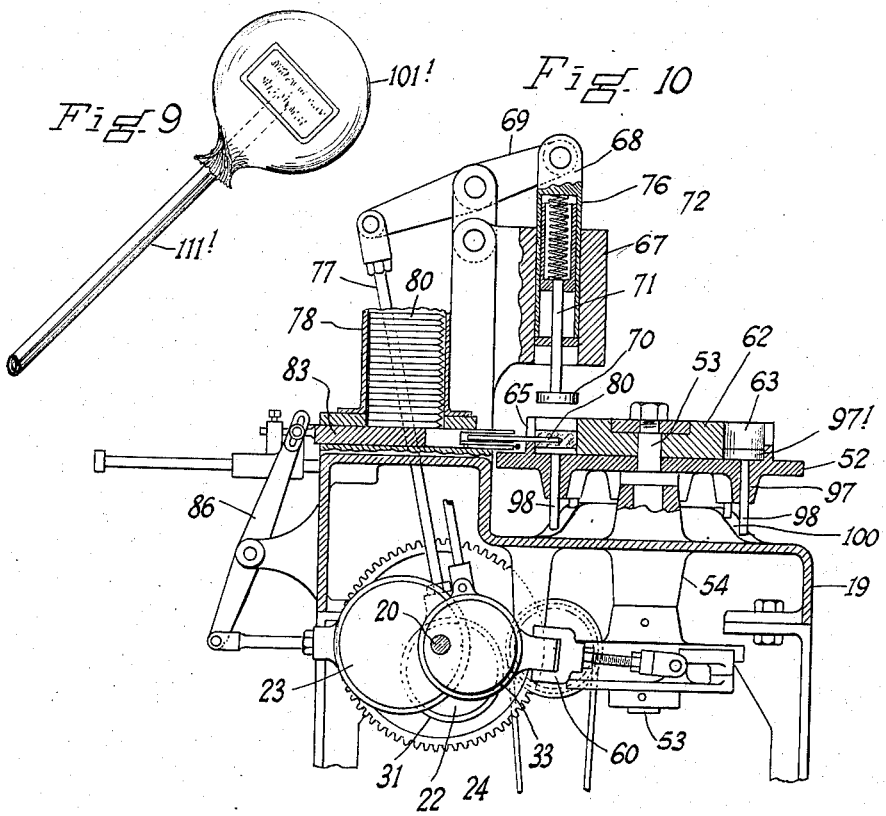
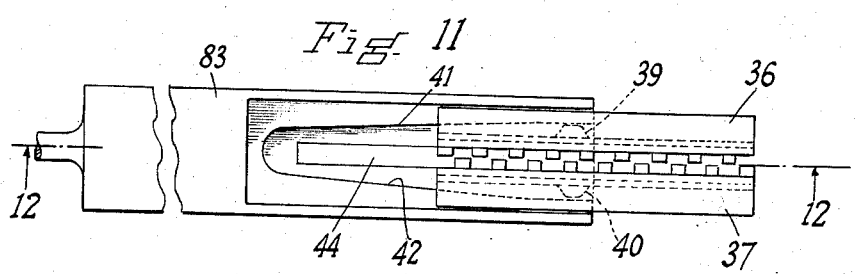
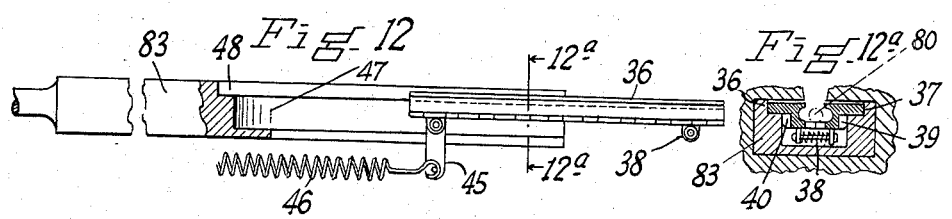
INVENTOR.
Sol Decker
BY
W. Holbrook ATTORNEY.

Nov. 28, 1944.    S. DECKER    2,363,503
CONFECTION STICK
Filed Dec. 21, 1939    7 Sheets-Sheet 4
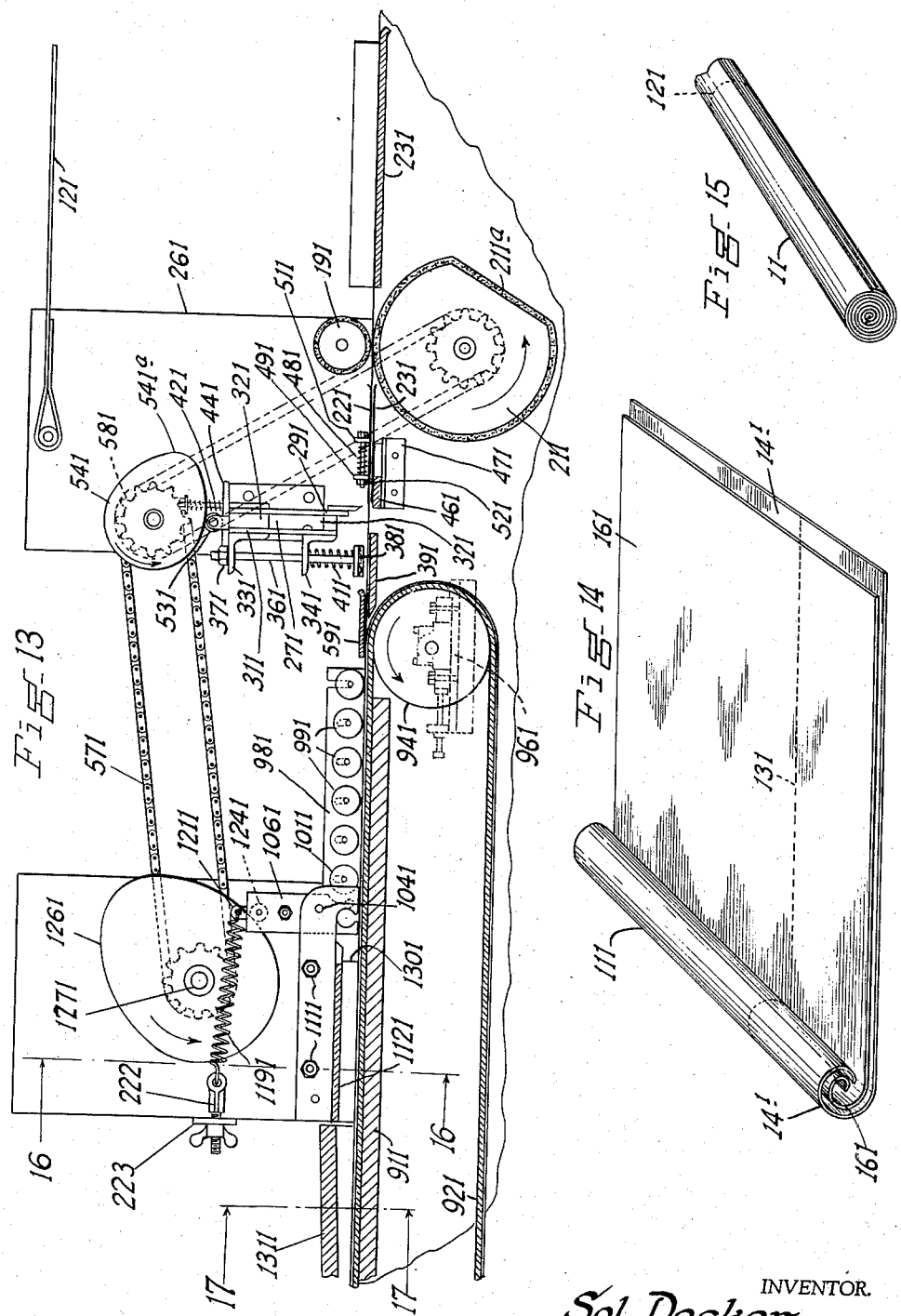
INVENTOR.
Sol Decker
BY
M. Holbrook  ATTORNEY.

INVENTOR.
Sol Decker

Nov. 28, 1944. S. DECKER 2,363,503
CONFECTION STICK
Filed Dec. 21, 1939 7 Sheets-Sheet 6
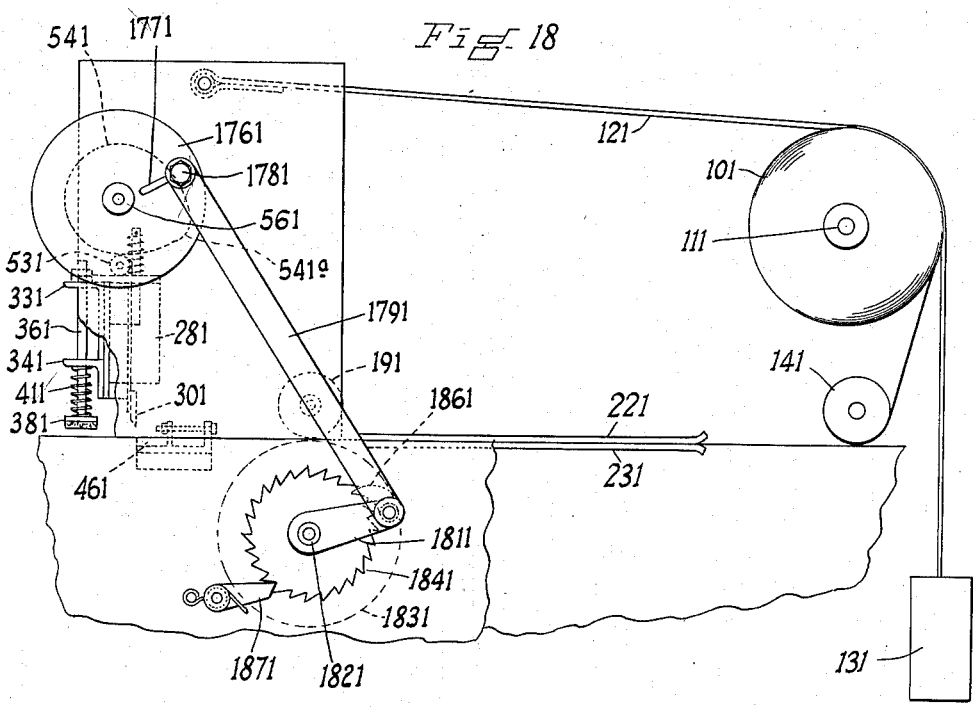
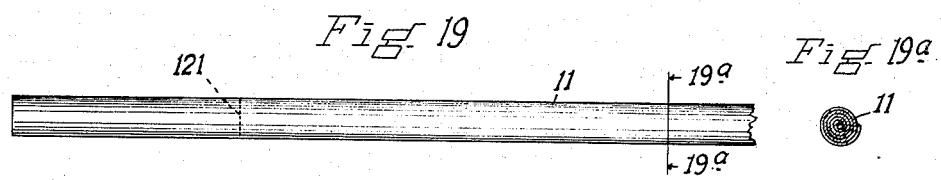
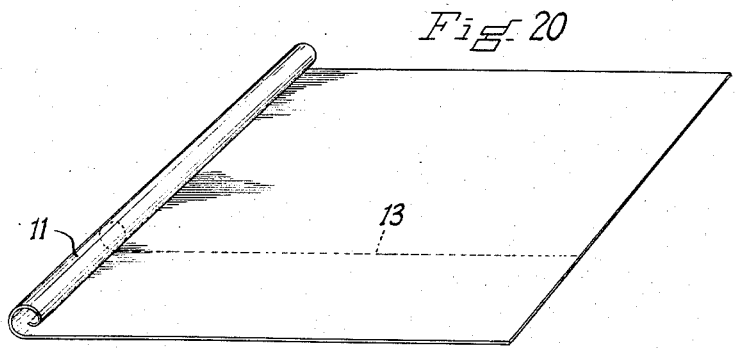
INVENTOR.
BY Sol Decker
M. Holbrook ATTORNEY.

Nov. 28, 1944.　　　　S. DECKER　　　　2,363,503
CONFECTION STICK
Filed Dec. 21, 1939　　　7 Sheets-Sheet 7
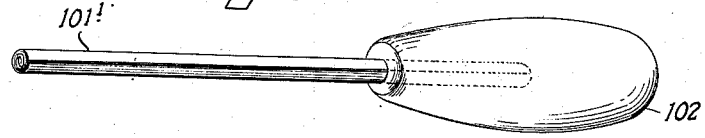
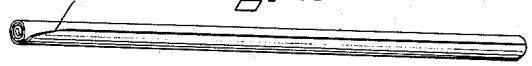
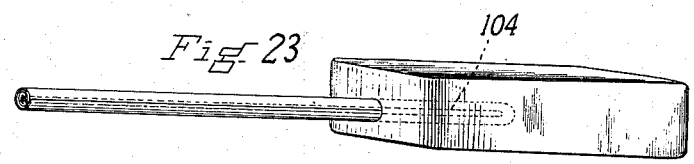
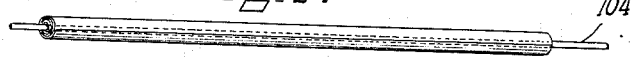
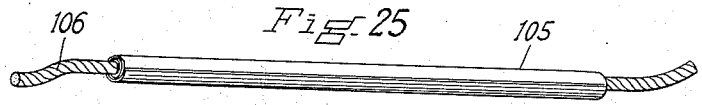
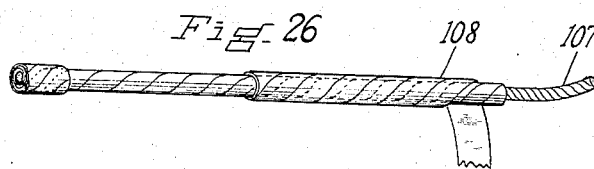
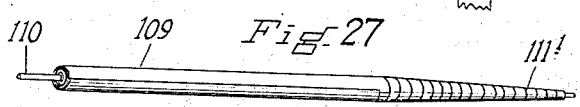
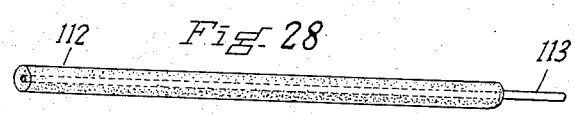
INVENTOR.
BY Sol Decker
ATTORNEY.

Patented Nov. 28, 1944

2,363,503

UNITED STATES PATENT OFFICE 2,363,503

CONFECTION STICK

Sol Decker, Chicago, Ill., assignor to Setter Bros. Inc., Cattaraugus, N. Y., a corporation of New York Application December 21, 1939, Serial No. 310,382

2 Claims. (Cl. 99—138)

This invention is concerned with improvements pertaining to the confection industry, and it more particularly relates to that branch of the industry involving the manufacture, sale, and use of stick supported confections.

This application is a continuation in part of the prior co-pending applications, Serial Nos. 189,846, filed February 10, 1938, and 45,651, filed October 18, 1935, which have now become abandoned.

One object of the invention is to present a stick supported confection which will not be subject to the dangers of the wood stick supported confections of the prior art, dangers which have led to many accidents and have caused the sale of the prior art confections to be forbidden by law in many communities.

Another object is to provide a tightly rolled and substantially solid confection stick manufactured from low cost sheet material and having such rigidity characteristics that it can effectively be used in the manufacturing processes by which stick supported confections are produced in large quantities.

The invention also embodies within its purview different types of apparatus for manufacturing the illustrative products, and certain methods carried out by those types of apparatus as well as other methods hereinafter referred to.

Other objects of the invention will appear in the following specification in which the details of certain preferred embodiments are described in accordance with the requirements of the Federal Statutes, and more particularly Sec. 4888 R. S.

The description is to be read in conjunction with the accompanying drawings in which similar reference characters refer to similar components.

In the drawings:

Fig. 1 is a diagrammatic view in the nature of a vertical section disclosing apparatus for manufacturing the illustrative confection product.

Fig. 2 is a diagrammatic view in the nature of a vertical cross section showing other apparatus for carrying out one of the illustrative processes when a thermo-plastic adhesive is used with the paper strips for forming the illustrative sticks.

Fig. 3 is a view in the nature of a vertical section indicating apparatus which may be used in conjunction with certain parts of the apparatus shown in Figs. 1 and 2 to form flat confection sticks.

Fig. 4 is a view in the nature of a perspective view showing one of the products resulting from the use of the Fig. 3 apparatus.

Fig. 5 is a perspective view of one type of illustrative confection product which may be produced by the illustrative apparatus.

Fig. 6 is a view in the nature of a perspective view of the illustrative confection product showing a body of edible material supported by a tightly rolled paper stick which has the advantage of involving no danger to the user of the confection by reason of breakage or splintering and yet is capable of advantageous use with automatic machinery for manufacturing the composite product and assembling the sticks and edible bodies in operative relationships.

Fig. 7 is a detail view of the mechanism for producing the loosely convoluted paper stick strips formed during the operation of such apparatus as that shown in Figs. 1 and 2. This view is on an enlarged scale showing one of the loosely compacted stick rolls about to be discharged from the convoluting zone.

Fig. 8 is a detailed view of the members defining the convoluting zone, showing these members in their operative relationships, and indicating their initial action in beginning the convoluting of a stick strip.

Fig. 9 is a view in the nature of a perspective view showing an illustrative confection product involving the convolutely wound paper stick in its relationship to the edible body.

Fig. 10 is a view in the nature of a vertical section showing apparatus for carrying out a process by which the illustrative confection product is formed when the semi-flexible sticks are gripped near their impaling ends and forced by the gripping members into the edible bodies.

Fig. 11 is a detailed view of part of the mechanism of the Fig. 10 apparatus. It shows, in plan, parts of the gripping and ejecting mechanism which grip the illustrative sticks near their impaling ends and force them into the edible bodies.

Fig. 12 is a view mainly in the nature of a vertical section taken on the line 12—12 of Fig. 11.

Fig. 12a is a vertical section taken on the section line 13—13 of Fig. 12 and showing the relationship of the parts of the gripping and ejecting mechanism which grips the illustrative sticks near their impaling ends and forces them into the edible bodies.

Fig. 13 is a view in the nature of a vertical section showing a part of the apparatus indicated in Fig. 1 of the drawings. This view shows the paper cutting mechanism and the mechanism associated with the convoluting zone, upon an enlarged scale.

Fig. 14 is a perspective view which illustrates the method of forming a stick wherein a plurality of layers of paper are used.

Fig. 15 is a view in the nature of a perspective view showing the illustrative confection stick.

Figure 16:
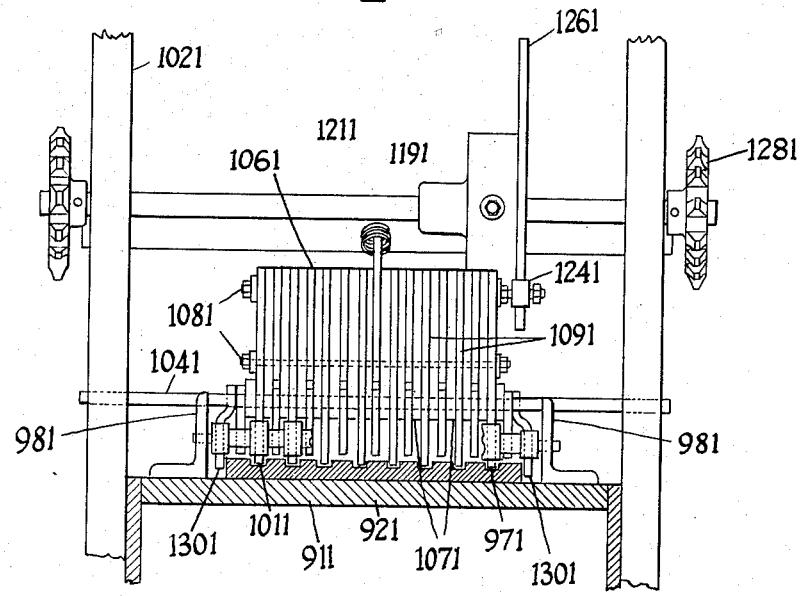

Fig. 16 is a vertical section taken on the line 16—16 of Fig. 13.

Figure 17:
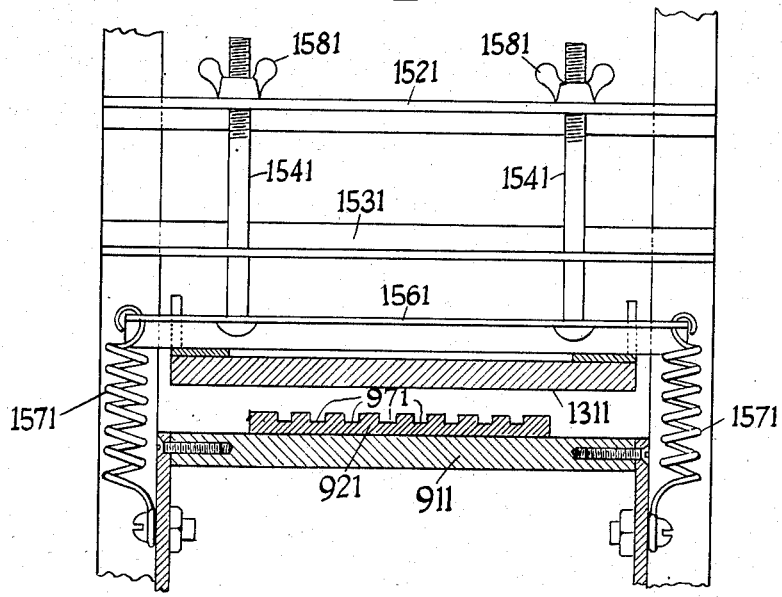

Fig. 17 is a vertical section taken on the line 17—17 of Fig. 13.

Fig. 18 is a view partly in the nature of a side elevation and partly in the nature of a vertical section showing modification of parts of the illustrative apparatus for properly synchronizing the movement of the strips from which the illustrative sticks are formed.

Fig. 19 is a view in the nature of an elevation of one of the illustrative confection sticks indicating a weakened zone formed by perforations which are made in the paper during its movement through the illustrative apparatus.

Fig. 19a is a transverse vertical section on the line 19a—19a of Fig. 19.

Fig. 20 is a view in the nature of a perspective view indicating the manner in which the Fig. 19 stick may be formed.

Fig. 21 is a perspective view of another form of confection product produced in accordance with present invention.

Fig. 22 shows in a perspective view the nature of the confection stick employed in connection with the Fig. 21 structure.

Fig. 23 is a view in the nature of a perspective view of a further embodiment of the completed product.

Fig. 24 is a perspective view of the confection stick which may be employed in the Fig. 23 product certain structural features of the stick being accentuated in order to illustrate one manner of forming sticks of this type.

Fig. 25 shows a similar type of confection stick including a rolled paper body formed about a fibrous core which may act somewhat as a mandrel during the formation of the stick.

Fig. 26 is a view somewhat similar to Fig. 25 except that it indicates a different method for producing the outer reinforcing tubular structure for the central fibrous core.

Fig. 27 is a view in the nature of a perspective view showing a stick strip which is manufactured by convolutely winding paper around a fibrous mandrel so as to form a tapered end for the stick.

Fig. 28 is a view somewhat in the nature of a perspective view and partly in the nature of a phantom view indicating an embodiment of the invention in which the illustrative stick is formed by a process in which a plastic material is shaped around a flexible core.

Fig. 29 is a view in the nature of a side elevation which indicates a confection stick consisting of twisted fiber formed by treating a suitable ribbon of paper so that successive spirals of the ribbon are secured together by an adhesive or cementing agent in order that a stick strip of the desired degree of rigidity may be formed.

The confection product illustrated in Fig. 6 involves a tightly rolled and substantially solid paper stick 111 within the edible body 101. The stick possesses a degree of rigidity sufficient to support the edible body in superposed position during the consumption thereof and it is of such a character that it will not involve danger to the user by reason of splintering or breaking so as to present sharp edges liable to cause serious accidents. The stick may have a weakened portion as indicated at 121 produced in a manner to be described below.

The paper of which the stick 111 is formed may be of any usual type such as that produced from wood pulp, and is presented to a forming mechanism after it has been cut into stick strips of appropriate size. When the stick is to have plane or square ends rectangular paper strips are employed. These strips are fed to an initial forming mechanism which curls up the leading edge of the strip as indicated in Fig. 20 and continues this convoluting or curling up movement until a loosely wound rolled body such as that shown in Fig. 7 at 1291 is produced. This loosely rolled body is then acted upon by elements which present cooperating surfaces having relative movements so that the loosely rolled bodies move along one of these surfaces. The two surfaces are so arranged, that from the point of entry of the sticks into the passageway between them, to the point of delivery, the space between the surfaces is gradually diminished. The loosely rolled up paper is, therefore, gradually rolled down to a tightly wound body until, at the point of ejection, a very firm and tightly wound stick body is produced. It is substantially solid, its inner convolution being substantially rolled on itself so that there is substantially no tubular opening left.

At a suitable point before or during the rolling operation adhesive material may be applied to the paper so that contiguous convolutions substantially throughout the body of the completed article are thoroughly bonded. Various adhesives and various methods of applying them may be used so as to produce the substantially inflexible stick. The adhesive should extend to the innermost convolution, but in some cases, and particularly with some types of adhesives, the desired degree of rigidity is obtained if a major proportion of the convolutions are adhesively secured together, even though the adhesive may not extend to the very center of the rolled up paper body.

In applying an adhesive I prefer to coat the entire inner surface of the paper so that the adhesive engages all of the convolutions. Preferably the adhesive is applied as a size or coating for the paper, the paper being fed to the forming mechanism in a dry condition so that its convolution is expedited and simplified. By the application of moisture, moisture and heat, or heat alone, depending upon the character of the adhesive used, successive convolutions are secured together and the desired rigidity of the ultimately formed bodies is obtained.

For the purpose of affording a safety factor in the use of the finished article I may provide the stick strips with a series of perforations running longitudinally thereof so that the paper, when it has been rolled up will present these perforated portions in overlapping relationship to produce the weakened portion 121. By controlling the character of the perforating or scoring, the portion 121 may be made of such strength that normal handling of the stick and the assembly thereof with an edible body will not cause breakage of the stick. When, however, the finished product is subjected to a sharp blow, it will break at the weakened spot before penetrating body tissue.

When the stick has been completed it may be waterproofed. Preferably a waterproofing agent is employed which is sufficiently solid at normal room temperatures to avoid tackiness. Preferably also, a very thin coating of the waterproofing agent is applied, the application being carried out while the waterproofing material is in the liquid condition.

I may use special types of papers such as glassine or other transparent papers including the type of paper which is sold under the trade name of "Cellophane." In general, this type of paper is relatively thin, and to avoid obvious objections from sales and fabrication standpoints, I may use a combination of papers and secure substantially the same final appearance. For example, in Fig. 14, I show an outer sheet of paper 141 and an inner sheet 161, the two sheets being slightly separated for the purposes of illustration. The paper 161 may be a common type of pulp paper while the sheet 14 may, for example, be a high grade sheet of waterproofed Cellophane. The latter may be colored or transparent, and in the latter case, the sheet 161 may be colored so that it will show through the transparent outer sheet. These two sheets in superposed relation are rolled simultaneously in the manner indicated in Fig. 14 to produce the final tightly rolled product indicated in Figs. 5 and 6.

The invention may be employed to produce the flat stick shown in Fig. 4, this type of stick being produced in substantially the same manner as the round stick, but instead of completing the compacting rolling operation until the paper has been tightly wound, it is first rolled to a substantial degree of tightness and then pressed flat by passing it between two pressing members. In this case, the final pressing operation produces the same compactness and tight engagement between successive convolutions as are found in the round stick. When I refer to successive convolutions it is to be understood that I am employing this language to refer both to the circular type found in the round stick and other types of convolutions resulting from flattening or otherwise treating the rolled up bodies.

As to the bonding of adjacent convolutions of the stick I, in some instances, employ the paper itself as an adhesive by causing an inter-felting action between successive convolutions.

*Method of and apparatus for producing the stick supported confection*

The method by which the product including the assembled sticks and edible bodies are produced perhaps can best be described with reference to the apparatus which is shown in Fig. 10 of the drawings. This apparatus is shown as an illustrative type of mechanism for carrying out the method. The apparatus includes a platform 17 with reference to which a driving shaft 20 is rotatably mounted. The components of the apparatus are driven in properly synchronized relationship from this shaft, and the drawings illustrate mechanism whereby such operation is carried out. This mechanism includes the eccentrics 22, 23 and 24 operatively connected with other power transmission parts which will be later referred to.

The eccentric 24 is associated with an eccentric strap 33 which is connected with a pawl and ratchet mechanism associated with the upright turntable shaft 53 journalled in a standard 54 integral with the platform 19. The connections whereby the pawl and ratchet mechanism at the base of the shaft 53 are associated with the eccentric strap 33 include the pivotal connection 60 and takeup mechanism for properly controlling the step by step movement of the turntable shaft 46.

The turntable shaft 53 carries with it a turntable 52 upon which is mounted a circular member 62 having a number of molding pits 63 formed therein and arranged circumferentially. These pits are adapted to receive separated masses of the plastic or semi-plastic edible material which are dropped into the molding pits at the proper time during the rotation of the turntable.

The bottom of each molding pit 63 is formed by a bottom die 97 closely fitting the sides of the pit and having a die stem 98 extending downwardly and slidably mounted in a boss 97 so that during the rotation of the turntable the bottom dies may be caused to move upwardly and eject the completed confections from the molding pits by reason of contact of the lower ends of the pit stems 98 with a fixed cam 100 mounted upon the platform 19.

The step by step movement of the turntable is so timed that it brings one of the molding pits 63 to the impaling position which is indicated at the left-hand side of Fig. 10. Thereupon the movement of the turntable ceases and the stick gripping and projecting slide 83 acts to grip one of the confection sticks 80 in the magazine 78 and force that stick through the bottom of the channel 65 formed in the outer peripheral wall of each of the molding pits. Further movement of the slide 76 causes the gripped and reinforced end of one of the semi-flexible confection sticks 80 to impale the edible body which has been positioned in the aligned molding pit.

The stick gripping and reinforcing devices carried by the slide 63 may be so constructed and arranged that they will extend a short distance into the stick impaling portion which ultimately is placed within the confines of the edible body, and, in this event, such reinforcing action of the impaling portion will prevent breakage or undue bending of the impaling portion while the upper molding die 70 is caused to move downwardly through a molding pit 63 and form the edible mass about the impaling end of the stick.

The molding die 70 which operates upon the plastic or semi-plastic edible bodies in the molding pits 63 is caused to operate in properly timed relationship to the movement of the stick gripping and impaling device by driving connections which include the eccentric 22 and the associated eccentric strap 31. A pivoted link 69 is connected with the eccentric strap by a connecting rod 77 and the other end of the link 69 is pivotally connected with a hollow reciprocating element 68 which slides vertically within a bearing 67 secured to the framework of the apparatus.

The stem 71 has slidable movement through the bottom portion of the cylindrical chamber within the member 68 and the upper end of this stem is screw threaded into the recessed spring cap 74 which has a fairly close slidable fit with the cylindrical interior of the member 68. The spring 72 is interposed between the stem 71 and that part of the member 68 which forms the upper boundary of the chamber within that member.

Appropriate devices may act as a limit stop determining the extent of the downward movement of the top die 70 and the pressure that this die exerts upon the edible body is determined by the compression characteristics of the spring 72. Furthermore, the amplitude of the movement of the plunger may be controlled by adjusting the connections at the end of the connecting rod 77 joining the end of the link 69 and the eccentric strap 31. To permit the above indicated movements of the different parts of the plunger driving the mechanism, the link 69 is pivotally connected intermediate its ends with a supporting link 76 which at its lower end is mounted on a fixed part of the frame.

Figs. 11, 12, and 12a of the drawings illustrate stick gripping and ejecting mechanism which forms a part of the apparatus illustrated in Fig. 10. This gripping mechanism is particularly adapted for use with the moderately rigid sticks of the present invention. In some cases the degree of rigidity of the illustrative sticks may be so low (while still being high enough to enable the edible body of confection to be satisfactorily handled and supported during consumption thereof) that the sticks are unable to withstand such forces as are necessary in causing the sticks to impale the edible masses employed in the process carried out by such apparatus as is illustrated in Fig. 10 of the drawings. The mechanism indicated in Figs. 11, 12, and 12a is particularly adapted to advantageously utilize sticks of such low degrees of rigidity.

The illustrative stick gripping and ejecting mechanism includes the slide 83 which is generally rectangular in cross section as indicated in Fig. 12a. Associated with this slide are coacting stick gripping members 36 and 37 formed as particularly indicated in Figs. 12 and 12a of the drawings and biased by the compression spring 38 to their stick receiving relationship indicated in Fig. 12a. These members have cam contacting projections 39 and 40 located at positions intermediate their lengths for contact with the cam surfaces 41 and 42 so as to cause the members 36 and 37 to be brought together to grip the stick 43 as the slide 83 is forced to the right by the link or lever 86.

When the movement of the slide towards the left is begun by a corresponding movement of the lever 86, the cam surfaces 41 and 42 coact in such a manner with the projections 39 and 40 that the spring 38 is allowed to exert its pressure upon the members 36 and 37 and cause them to release the stick after it has been forced into an edible mass within one of the molding pits 63.

The slide 83 is formed at its bottom with a slot 44 to allow movement of the arm 45 for the purpose of insuring the retractile movement of the members 36 and 37 when the slide 83 is moved to the left and toward its stick receiving position. The arm 45 may be biased by a spring 46 in order to insure that the projections 39 and 40 are maintained in light contact with the cam surfaces 41 and 42 during the retractile movement of the slide 83. The slide 83 is of course appropriately recessed as indicated at 47 to receive the spring 38 and the downwardly projecting parts 36 and 37, and an upper recess 48 somewhat wider than the cam recess 47 receives the outwardly extending uppermost parts of the members 36 and 37.

The stick forming apparatus

In describing one feature of my invention I shall now refer to the apparatus which is indicated in Fig. 2, which shows the entire apparatus starting with a supply of paper from a roll and the delivery of the flattened paper sticks to the discharge end of the apparatus.

Generally, the apparatus consists of means for delivering paper or other fibrous sheets to a convoluting zone in which the sheets have imparted to them a loosely rolled configuration. According to the preferred embodiment of my invention the paper is delivered as a master strip to a cutting mechanism which is arranged to cut the master strip into sheets of the length desired. Sheets, or stick strips, wider than the length of the desired sticks may be severed from the master strip and the sticks thereafter cut to the desired length after the sticks are formed. The severed paper stick strips are carried along by an endless belt under a set of rollers for delivery to the convoluting mechanism. Continuous forward movement of the stick strips causes them to roll up into the convoluting zone and to form a relatively loose roll, the device which produces the convoluting action preferably relaxing after the stick strips are fed thereto in order to facilitate the continued movement of the stick strips into the convoluting zone.

The loosely convoluted rolls are formed in the convoluting zone and then ejected from that zone and delivered to a compacting mechanism wherein which the rolls are carried along a passageway of gradually decreasing width, with the elements forming the opposite sides of the passageway having relative movement.

The compacting mechanism includes a part of the endless belt and a stationary member cooperating therewith to continuously roll the loosely convoluted paper rolls through the tapered passageway. The rolls are thus gradually decreased in diameter and the number of their convolutions simultaneously increased until they are wound tight enough to form the substantially solid stick strips.

Referring now more in detail to the above indicated figure of the drawings, I show a roll of paper 101 rotatably mounted upon a support 111 with a tension adjusting means 121 herein shown in the form of a strap engaging the paper and held in the desired contact therewith by a weight 131 to apply the required tension to the paper.

When it is so desired, a pair of coacting perforating members 171 and 181 may be employed to produce a line of perforations along the master paper strip in a selected position for a purpose which will hereinafter be described. From these perforating members, the master paper strip passes between the rollers 191 and 211, the latter being positively driven and having a cutaway portion 211a by means of which the forward motion of the master strip is interrupted.

Thence, the paper is directed by the guides 221 and 223 to a cutting mechanism which is shown in better detail in Fig. 13 as including an upright plate 261 secured to the main frame of the apparatus. Preferably, there is a plate 261 at each side of the machine and each plate has a pair of narrow upright brackets 271 and 281 secured thereto in such a way as to present a channel in which the knife body 291 is slidably guided. A blade 301 is attached to the knife body 291 at its lower edge. A plate 311 is supported parallel to the knife body 291 by blocks 321 and angles 331 and 341 projecting from the plate 311 so as to provide bearings for a plurality of upright rods 361. The upper ends of these rods are threaded to receive nuts 371 which control the positioning of the bottom of the rods and more particularly the presser foot 381 carried thereby, with reference to the master paper strip which is moving along the plate 391. This presser foot 381 is adapted to engage the upper side of the paper to hold it stationary during the cutting operation and the springs 411 are disposed between the angle 341 and the presser foot 381 to press the latter yieldingly against the paper.

The knife 301 is held in its upright position by a pair of springs 421 which are positioned around upwardly extending posts 431. One end of each spring engages a stop carried by the post and the other end engages a plate 441 carried by the upright frame plate 261.

Co-operating with the knife blade 301 is a straight edge 146 in the form of a metal bar positioned immediately beneath the paper and running the length of the knife. This straight edge rides on a pair of angles 471 secured to the main frame of the apparatus and the spring 481 is compressed between the pair of lugs 491 and 511 carried by the straight edge and the angles 471 for the purpose of co-operating with the knife in its severing action to prevent interruptions of that action and to permit the proper operation of the knife. This spring is held in its operative position by a bolt 152 which extends therethrough. The position of the knife co-operating straight edge may be adjusted by the rotation of a nut on the end of this bolt.

Above the knife assembly is a roller 531 journalled on a stub shaft or trunnion carried by a pair of upstanding lugs. This roller rides against cam 541 mounted on shaft 561 and the latter is shown as being driven by a chain 571 which is trained over a sprocket gear 581 carried on the stub shaft or trunnion. The driving mechanism from the source of power to the chain 571 is such that the cutting operation is properly synchronized with the other operations.

As the master paper strip is fed from the supply roll 110 through the guides 221 and 231, it proceeds to a position below the knife blade 301, and onto the plate 391 and below the guide 591. When the cutaway portion 211a of the feed roller 211 reaches its upper position, the forward movement of the master paper strip is arrested and the cam 541 has now reached the position wherein the portion 541a engages the roller 531 and moves the knife blade downwardly. This movement causes the presser foot 381 to engage the master strip and hold it tightly against the plate 391 in order to avoid any possibility of forward movement of the master strip during the cutting operation.

After the master paper strip is gripped between the member 381 and the plate 391, the knife immediately engages the paper and, co-operating with the straight edge 461 in a scissors fashion, cuts the paper off exactly at right angles to the longitudinal edge thereof. The force of the springs 421 thereupon moves the entire knife assembly upward immediately upon the passage of the portion 541a of the cam 541 from contact with the roller 531. The severed stick strip of paper is then disengaged by the presser foot 381 and is permitted to advance by reason of its contact with the endless belt 921. The feeding mechanism for the master strip again moves the latter forwardly preparatory to another severing operation. This action takes place at a high rate of speed with only a momentary stop for the cutting operation.

From the cutting mechanism forwardly, the apparatus includes a long metal base plate 911 over which the upper run of the endless belt 921 passes. The latter is carried on rollers 931 and 941 which are mounted on shafts suitably journalled in the frame and associated with adjusting mechanism whereby the tension upon the endless belt may be maintained at the desired value. In this connection, it should be noted that the belt must travel in a directly straight path in order that a uniform and accurate rolling operation of the paper may take place. The belt 921 is provided with a plurality of grooves 971 which are more clearly shown in Figs. 16 and 17 of the drawings. The nature and function of this particular construction of endless belt will receive description below.

At opposite sides of the apparatus channel plates 981 are provided and they are conveniently utilized for the support of a plurality of rollers 991. The latter operate to hold the paper stick strips against the upper run of the endless belt 921. At the extreme left hand edge of the bearing plates 981, a sectional roller 1011 is provided.

In Figs. 16 and 17 of the drawings, I show the bearing plates 981 as angles secured to the base plate 911, and secured to opposite sides of the frame are a pair of upright plates 1021 and 1031 with a pivot bar or rod 1041 secured between them in such a position that it is parallel to the belt 921 and arranged exactly at right angles to the direction of movement of the belt.

Pivotally mounted on the rod 1041 are a plurality of fingers 1061 with the spacers 1071 arranged between them, the spacers and the fingers being secured together to form an integral or unitary body. Bolts 1081 extend through the entire series of spacers and fingers for this purpose. Between adjacent fingers 1061 are co-operating fingers 1091 of a similar unitary body including similar spacers connected by the rods 1111. The latter are suitably secured at the outside edges of the fingers. Beneath the fingers 1091 a plate 1121 is secured and arranged in spaced relation to the upper surface of the belt 921 so as to provide a passageway.

The fingers 1061 are provided with semi-circular end recesses 1131 and at the edges of these recesses there are projections 1141 and 1161 integral with the fingers 1061 and forming the end portions of the recesses. The fingers 1091 are provided with right angle extensions 1171 presenting generally semi-circular surfaces 1181 between the projections 1171 and the main body of the fingers.

When the fingers 1061 are in their roll forming position and portions 1161 extend into the longitudinal slots 971 of the belts 921 and thereby are positioned below the level of the paper stick strip supported on the belt. The pivotally mounted fingers 1061 and the fixed fingers 1091 taken together define a convoluting zone which is substantially circular in cross section with the top line of the endless belt 921 slightly cutting through this generally circular cross section as a chord thereof. Accordingly, when a stick strip is advanced by the belt and prevented from buckling by the roller assembly disposed immediately in advance of the convoluting zone, a stick strip is caused to roll up within that zone by reason of the fact that the forward end of this strip rides up along the inclined portion of the surface 1131 of the pivoted fingers. When the convoluting action begins the movable fingers 1061 preferably relax slightly to allow for the increasing diameter of the roll body which is being formed in the convoluting zone.

The fingers 1061 together with their associated spacers form a composite assembly which is approximately equal to the width of the master strip and this assembly is normally held in an upright position by a tension spring 1191 shown particularly in Fig. 13 which shows the cutting mechanism and the convoluting devices in greater detail. One end of this spring is secured to a fixed support 1121 projecting from one of the spacers, and the opposite end of the spring is fixed to a cross arm 223 by means of the adjustable connection 222.

Referring further to the convoluting zone mechanism, and particularly the movable finger construction as it is particularly indicated in vertical cross-section in Fig. 13 including the enlarged view of the cutting mechanism, the uppermost of the two tie rods 1081 extending through the assembly including the movable fingers 1061 carries at one end a roller 1241 which is engaged by a cam 1261 carried by the shaft 1271. The shaft is driven by the application of power to the sprocket wheel 1281 and the cam 1261 is so positioned, shaped and timed with respect to the movement of the paper that as a stick strip enters the convoluting zone, the assembly including the movable fingers 1061 is allowed to move slightly and gradually to accommodate the increasing diameter of the loosely wound roll, as the latter is formed. When the following edge of a stick strip is passed into the convoluting zone the finger assembly including the movable fingers 1061 is caused to pivotally move about the rod 1041 to the position indicated in the detailed view in Fig. 7 and in which the loosely wound roll is about to advance from the convoluting zone.

When the movable finger assembly defining a part of the convoluting zone is moved to the roll discharging position indicated in Fig. 7, the extensions 1141 of the fingers 1061 engage the loosely wound roll 1291 and, cooperating with the foreward movement of the upper run of the endless belt 921 ejects the loosely wound roll from the convoluting zone. Thence the roll moves along between the belt 921 and the fixed plate 1121 with a rolling motion. This mechanism has its operation so timed that when the movable finger assembly is returned to its initial position from its roll discharging position indicated in Fig. 7, another stick strip is immediately delivered to the convoluting zone so that there is no substantial loss of time during which the loosely wound roll 1291 is being released. This releasing action occurs during the time in which the master strip is being severed to form a succeeding stick strip and excessive loss of time during the operation of the apparatus is thereby prevented.

In the operation of the convoluting mechanism there is at times a tendency for the stick strip to slip sidewise and form a roll with one pointed end and one hollow end. Guides 1301 carried by the stationary finger assembly including the fingers 1091 and the rods 1111 engage the edges of the belt and operate to keep the belt in alignment with the fingers so as to normally prevent the formation of such pointed rolls. Thus the movement of the stick strips is maintained in a direct line and the proper positioning of the movable fingers 1061 is promoted. The latter is particularly important with reference to the alignment of the extensions 1161 with the grooves 971 in the belt 921.

A plurality of top plates 1311 are positioned above the belt 921 in spaced relationship thereto as indicated in the enlarged view of the cutting mechanism and convoluting mechanism indicated in Fig. 6 of the drawings. These plates extend from the fixed member 1121 toward the pulley 931 which is indicated in Fig. 6, showing the entire mechanism including the secondary compacting mechanism. Preferably the top plates 1311 are so mounted upon the frame that they may be adjusted with respect to the surface of the belt 921. A single plate of greater size may be substituted for a plurality of plates 1311, but whatever this particular arrangement, the plate structure is so positioned relative to belt 921 that together they define a compacting passage which tapers gradually toward the discharge end of the belt, the vertical dimension of this passage decreasing toward that position. The action of the endless belt 921 upon the loosely wound rolls proceeding through the tapered passage causes the rolls to be decreased in diameter and the number of convolutions in each roll to be simultaneously increased until a roll of the desired tightness has been produced. The mechanism just described thus acts to compact the loosely wound rolls and it may therefore be referred to as a compacting mechanism.

The tightly rolled sticks produced in the above indicated manner with their successive convolutions bonded to each other may be formed so as to have substantially the same hardness, toughness and other desirable characteristics of a high grade wooden stick. The illustrated sticks, are, however, superior to the wooden sticks in that they will not splinter or break at an angle and produce a rigid sharp structure which might cause injury. Furthermore, the illustrative sticks do not warp readily if they become wet and they will not lose their finish and present a rough or splintery outer surface if exposed to moisture.

Fig. 2 of the drawings includes mechanism whereby an adhesive may be applied to the compacted sticks. This mechanism includes an upper endless belt 1321 and a cooperating lower belt 1331. The former passes over pulleys 1341 and 1361 and the latter is operatively guided over pulleys 1371, 1381, and 1391. A short base-plate 1411 is interposed relative to a portion of the belt 1321 and the leading end of the belt 1331 to guide the rolled paper bodies to the passageway between the belts. The space here provided for these bodies is somewhat larger than the space at the end of the compacting mechanism in order to allow the rolled bodies to open slightly. This facilitates the application of the adhesive.

Below the pulley 1391 I provide a tank 1421 for a body of adhesive material in fluid form. An idler feed roll 1431 has its lower surface operating beneath the level of the body of adhesive and its upper surface in such close relation to the belt 1331 where it passes over the pulley 1391 that the adhesive is applied to the belt 1331 and thence to the compacted rolled paper bodies as they move along between the belts 1321 and 1331. When the latter is caused to advance somewhat more rapidly than the belt 1321 the rolled paper bodies will be tightened and the adhesive pressed into their adjacent convolutions. The position of the belt 1331 and the position of the feed roller 1431 may be adjusted to control the amount of adhesive applied.

Fig. 6 shows a secondary compacting mechanism operating upon the rolled paper bodies after the adhesive has been applied thereto. This compacting mechanism includes an endless belt 1441 trained over pulleys 1461 and 1471 and tensioned by them. The upper run of this belt rides over a base-plate 1481. A plate 1491 is supported by the frame structure above the upper run of the belt 1441 and is arranged so as to form a passage gradually decreasing in its vertical dimension, or tapering toward its smaller end at the stick discharge end of the belt 1441. Thus the rolled paper bodies are further compacted and the number of convolutions in each is increased while they are subjected to the action of this secondary compacting mechanism. Also, this compacting mechanism serves to complete the bonding of adjacent convolutions by completing the effect of the adhesive. It may under some circumstances be advisable to employ an upper endless belt in place of the plate 1491 and my invention is intended to include such structure and modification within its scope.

I have found that the degree of rigidity of the finished rolled paper sticks may be controlled by the type of adhesive which is used, and the method of applying the adhesive may be varied within the scope of the invention to correspond to the type of adhesive which is used. One adhesive which may be used is sodium silicate properly treated so as to make it insoluble. Some of the well-known gums, waxes, rosins, thermoplastics and other substances having adhesive properties, such as drying oils, may be used with suitable adjustments and modifications as required for the various conditions encountered.

The driving mechanism for the various parts of the apparatus including the primary and secondary compacting mechanisms indicated in Fig. 6 is not described in detail, but the various components of the apparatus may be operated in properly synchronized relationship from a single motor 1511 and connected by suitable power transmitting devices and speed reducing or increasing mechanisms.

The manner in which the presser plates 1311 are mounted with reference to the endless belt 921 is shown in the vertical cross-sectional view, Fig. 17. This view shows a transverse angle 1561 rigid with the plate 1311 and spring tensioned at its end by the tension springs 1571 which are secured at their lower ends to fixed portions of the framework of the apparatus. The lowermost limit to which the plate 1311 can be moved is determined by adjusting bolts 1541 which slidably pass through openings in the horizontal flange of the angle 1561 and through aligned openings in the horizontal and parallel angles 1521 and 1531. Plate 1311 may move upwardly against the force of springs 1471 to prevent breakage of the apparatus, and the lowermost operative limit of the lower surface to the plate 1311 may be changed by adjustment of the nuts 1581 at the upper ends of the bolts 1541. Thus the plates 1311 are held down with ample force to properly engage the rolled paper bodies, but if there should be any "pile-up" of those bodies due to faulty action of any part of the apparatus, or due to some defect in the paper, the springs 1571 will yield and permit the belt to carry away the piled up bodies.

In the modification of the apparatus indicated in Fig. 2 of the drawings, there is a pan 1621 for absorbent material 1611. This material is supplied with an aqueous fluid through a pipe system 1631 provided with appropriate regulators to deliver the proper amount of fluid substance. The absorbent material 1611 may be of felt, sponge, or a similar material. It partially fills the tank 1621 and projects downward through openings in the bottom thereof to engage the top surfaces of the rollers 991. The paper may be moistened by this equipment, or it may be treated with any suitable material in solution, such as rosin, mild water soluble acids, or the like, which may be utilized to cooperate with an adhesive such as sodium silicate to insolublize the adhesive or impart other desired characteristics thereto. An adhesive may be applied to the paper at this point in the operation of the apparatus and, when a certain type of adhesive is used, suitable means may be provided for drying the adhesive after its application of the paper.

The adhesive may be also subject to heat and in this event I provide a heating element 1641 so arranged as to transfer heat to the plate 1311 to dry the outside convolutions of the rolled and compacted paper bodies to produce a bonding action between their convolutions as the bodies are being further compacted. This heating means 1641 may particularly cooperate with the remainder of the apparatus when a thermoplastic adhesive is used. The heating element is illustrated as of electrical character, employing resistance elements.

When the rolled paper sticks are produced by the apparatus shown as including the heating device 1641 in Fig. 2, the rolled paper bodies may be caused to retain their shape after delivery from the discharge end of the compacting belt 921. Beyond the heating device there is a mechanism for coating the rolled bodies with a suitable substance, such as wax. This mechanism is arranged at the discharge end of the belt 921 and adjacent the heating device 1641. It includes a tank 1661 containing the coating liquid 1671. A segmented roller 1681 is rotatably mounted so that its lower portion extends below the level of the liquid 1671. This portion cooperates with an arcuate screen 1691 which likewise extends below the level of the liquid 1671 and forms, with the roller 1681, a passageway through which the sticks are advanced by the roller into contact with the liquid. The sticks are delivered by the roller 1681 onto a draining screen 1711 which may be vibrated by a shaker mechanism operated by an eccentric 1721. This screen is preferably inclined so as to cause the completed sticks to advance along the screen while they are drying.

The operation of the apparatus as a whole is believed to be made clear by the description of the operation of the various parts thereof. However, I desire to refer to other means which I may employ for bonding the adjacent convolutions for the rolled-up paper bodies. A sized paper may be bonded readily by the application of moisture accompanied, in some instances, by the application of heat. Other sized papers may be bonded without the application of moisture.

In some cases I prefer to apply a coating to the rolled-up paper bodies which, after drying, will cause them to have a more finished appearance. I may also coat the paper with an adhesive before rolling and such adhesive may be one which sets up by the application of heat, moisture, or some other agent. In this case the adhesive-containing pan 1421 of the Fig. 2 apparatus will contain such agent.

Dextrine, gelatin, or a mixture of gelatin and sugar, or some of the common gums or other adhesive, may be employed to produce a rolled-up stick of the desired characteristics, that is, a stick which will readily support an edible body without bending but will bend when unusual stress is imparted thereto. This type of stick may be assembled with confections, such as candies, by utilizing the method described in my co-pending application, Ser. No. 6626, filed February 15, 1935.

If the paper is first coated with adhesive on one side, the adhesive extends entirely to the core of the formed body and a high degree of rigidity will thus be imparted to the resulting stick. The rigidity of the stick may be also controlled by regulating the tightness of the rolled body. For example, a stick having an outside diameter of $\frac{1}{16}$" and rolled substantially tight has more rigidity than a stick of the same diameter shaped as a tube.

Whether the stick is made relatively more rigid, or relatively more flexible, the scoring or perforating described may be utilized to form a weakened zone to increase the safety factor pertaining during the consumption of the edible body.

A modified form of the master strip feeding means and the cutting mechanism is illustrated in Fig. 18 of the drawings. This mechanism includes a shaft carrying a knife operating cam 541 and also having affixed thereon the crank disc 1761. This crank disc is provided with a slot 1771 in which a pivot pin 1781 is adjustably mounted. This pin extends loosely through one end of a connecting rod 1791 the opposite end of which is pivotally connected to the outer end of an arm 1811 pivotally mounted on the shaft 1821.

The shaft 1821 also has a feed roller 1831 affixed thereon for advancing the master strip from the supply roll 101. Also affixed upon the shaft 1821 is a ratchet gear 1841 the teeth of which are intermittently engaged by the spring pressed pawl 1861 pivotally carried by the arm 1811. The shaft 561 is driven in appropriate synchronism with other parts of the apparatus and as it rotates it carries with it the crank disc 1761. The connecting rod 1791 is thereby given a reciprocating motion which is transmitted into intermittent motion by the action of the ratchet and pawl mechanism above described. Retrograde movement of the shaft 1821 and the ratchet wheel 1841 is prevented by a pawl 1871 which is pivotally mounted upon a fixed pivot. The master paper strip is thus given a positive step by step forward movement and it is maintained in driving contact with the surface of the roller 1831 by pressure upon the strip between that roller and the upper roller 191. With this mechanism the rate of advance of the master strip with reference to the operation of the cutting mechanism and the other parts of the apparatus may be regulated and controlled.

When it is desired that flat sticks be produced the double endless belt mechanism indicated in Fig. 3 of the drawings is used. This mechanism includes the upper endless belt 1911 trained around suitable rotating elements and appropriately tensioned between them. The lower endless belt 1921 is similarly mounted with its upper run positioned below the lower run of the upper belt and spaced therefrom so as to provide a compacting passageway tapering from its large end at A to its discharge end at B. These belts may be driven in unison.

The upper run of the lower belt 1921 is guided along the upper surface of a plate 1941 which is hollow and adapted to be connected with a heating medium such as steam. Similarly a hollow plate structure 1931 is positioned so as to guide the lower run of the upper belt 1911 and is also adapted to be heated by steam or some other medium. In place of the plates 1931 and 1941 other backing up structure may be provided for the adjacent runs of the belts. For example, a series of rollers may be used when it is not desired that the adjacent runs of the belts be heated. As clearly indicated in Fig. 3 the loosely rolled paper bodies pass into the tapered passageway between the belts near the point A, are gradually flattened as they advance along the tapered passageway, and are discharged at the point B. Scrapers 1961 are provided for removing the flattened bodies from the belts.

The loosely rolled sticks are fed between the belts as they are delivered from the convoluting mechanism and these bodies are directly conveyed to the flattening mechanism indicated in Fig. 3. In general, it is preferred that the sticks be somewhat readily compressible at the time they are delivered to the flattening mechanism. To this end they may be somewhat moist or they may contain some unevaporated solvent. They may also have their convolutions supplied with a thermoplastic adhesive which has not set. Although in general imparting the flat shape to the sticks tends to decrease the strength of the stick in one direction I find that the high degree of bonding between adjacent flat portions has a very desirable rigidifying action.

It is contemplated that the rolled sticks may be made of different cross sections by the use of suitable die mechanisms. The sticks may be forced through a die or a series of dies which gradually changes their circular cross section to one which may be polygonal.

As a modification of the apparatus indicated in Fig. 1 (which discloses the primary and secondary compacting mechanisms) or in Fig. 13 (which discloses the cutting and convoluting mechanism on a larger scale) I may produce sticks having pointed ends by using two presser feet instead of the single presser foot or presser bar 381 which is illustrated in Fig. 13. In this event one of the presser feet will be caused to disengage a stick strip slightly before the other. The strip may be turned slightly sideways with the result that one end of the stick will be pointed when the completed article has been produced. I may also produce a similar effect by so changing the position of the plate 1311 that one of its sides is at a greater distance from the belt 921. Similarly, the stick strips may be cut into trapezoidal shapes.

The illustrative sticks may be produced with papers of different color. This is a particular advantage of the inventions covered by this application inasmuch as the wooden sticks of the prior art can not be colored satisfactorily.

The invention also is of such a scope that it covers the delivery of two parallel master strips and the formation of the completed products of adjoining convolutions of different colors. Cellophane, colored or transparent, may be used in this modification of the invention and so arranged that it is finally positioned on the outside of the rolled up bodies. For example, two supply rolls may be employed and the paper fed in with one master strip above the other, advanced, cut off, and formed in the same way as the single master strip above referred to. Sometimes, to avoid slippage, it is advisable to supply a small amount of adhesive between the two sheets as they come together from their respective supply rolls. I may also form these sticks with advertising matter printed thereon either on the outside or the inside of the rolled up bodies. It is very difficult to print satisfactorily on a wooden stick but printed matter may be applied to the paper rather inexpensively, and the paper rolled in such a particular manner that the printed matter will ultimately show on the outside of the stick. I may also print advertising matter or the like on separate strips, modify the illustrative process so that these printed strips are positioned on the inside of the stick, and use such an adhesive that it forms a seal which is readily broken so that the stick, after consumption of the confection, may be readily removed and the advertising strip withdrawn. This is an advantage in permitting the use of flags, pictures, coupons, or premium literature in the sticks for the purpose of sales promotion.

One advantage of the illustrative process is that, if desired, a flexible fibrous core may be introduced so as to ultimately form the center of the completed sticks. For example, by extending such a fibrous core as a twisted paper strand or some cord formed of fibrous material into the convolution zone as the paper is rolled up, the stick strip may be rolled tightly about the core.

According to the general principles of the features of the invention indicated in Figs. 21 to 29 inclusive I use a confection stick which is moderately rigid, and one which will maintain substantially uniform and desirable characteristics under normal conditions incident to manufacture, storage, sale and consumption of the confection product. The types of confection sticks shown in these figures will, however, readily collapse without splintering if they are subjected to a moderately sharp blow. In other words, their degree of rigidity is so low that they will prevent accidents to children who are, in the main, the consumers of the illustrative confection product. The illustrative sticks may be described as moderately rigid sticks having decreased resistance to the breaking stresses incident to consumption. This consequently, gives them a high factor of safety in use and results in an important improvement in the ultimate product.

The confection stick of the type indicated in Figs. 21 to 29 inclusive is fabricated principally from fibrous materials. Several methods of constructing the stick are indicated. Many of them, however, have the common characteristics that the outer tubular reinforcing structure of the stick is continuous thereby producing a tubular portion which is particularly resistant to bending. In addition, a sufficient proportion of the fibers run generally longitudinally of the stick to impart adequate longitudinal strength to resist bending and breaking at relatively low stresses.

In the preferred forms of the invention indicated in Figs. 21 to 29 a substantial integral tubular outer structure is provided and it is manufactured by methods which, in some cases, may be similar to those previously described.

Referring to Fig. 21, I show a confection product consisting of the tightly wound paper stick 101 and a confection body 102 which may be molded or shaped around the end of the stick 101. The manner in which the stick 101 is produced will be somewhat clearer from an examination of Fig. 22 wherein the outer convolution of paper is loosened. The paper is wound in a volute fashion and in such a manner that cross sections taken at various places are identical and are similar in appearance to the end of the stick shown in Figs. 21 and 22. At least the edge 103 of the outer convolution is adhesively secured to the convolution immediately below it so as to form a substantially continuous outer tube like structure.

In forming the confection stick indicated in Figs. 21 and 22 I find that I can fit the paper into a forming lip which produces a small substantially cylindrical fold at the end of the paper. When the paper is thereafter delivered to a point between two relatively moving belts it is caused to be rolled up about the first convolution so as to produce the structure indicated in these figures.

As to the adhesives which I may employ in the manufacture of the stick 101 I may use spirit soluble glues such as some of the cellulose derivatives, taking care, of course, that no objectionable solvent is employed. I may also, in some instances, employ adhesive substances which set by the action of heat. In the latter case, the sticks are run continuously through a heated die to cause the adhesive to set. When certain types of papers are used waterproofing of the stick is not necessary. In most cases I have found that it is preferable to employ a thin coating of a suitable waterproofing agent. In general, I prefer to use a waterproofing material which has a melting temperature well above body temperature and above the maximum summer heat.

In Figs. 23 and 24, I show a modification in which a core 104 is employed. The paper is convolutely wound around this core in a manner similar to the methods which have been previously described, and I prefer to use a fibrous core of relatively small diameter, preferably an inexpensive twine or cord. When employing such embodiment of the invention, a slight modification of the described process is utilized to keep the core from turning with respect to the paper. The core may be lightly secured to the leading edge of the paper and the paper then given an initial curvature by passing it under a curled forming lip. The paper is then rolled around the core by appropriate mechanism similar to the mechanisms which have been above described. I may, alternatively, employ oppositely moving belts acting upon opposite sides of the core to which the leading edge of the paper is secured. In the manufacture of the stick indicated in Figs. 23 and 24 of the drawings the bonding material is also applied.

In Fig. 25, I show a structure including a rolled paper body 105 wound around a twisted fibre core 106. In this embodiment the core is somewhat thicker than the corresponding element of the Fig. 24 embodiment and it may consist of a continuous strip of paper from 1½ to 3 inches wide collapsed upon itself and twisted to form a substantially solid flexible strand. Ordinarily, there is approximately one complete twist per lineal inch of the strand. The core structure is loose, however, in that the strand may be readily untwisted by hand to recover the ordinary paper strip from which the strand is made. This material, although possessed of fair tensile strength does not resist bending when used alone and is not of such a character that it may be used alone as the confection stick. In the first place, it cannot be used with automatic equipment now employed in the manufacture of the illustrative confections and it does not form a sufficiently rigid confection support. Hence, I employ the outer tube 105.

In the embodiment indicated in Fig. 26, the core 107 is of suitable fibrous material but the outer tubular structure 108 is spiraled onto the core so as to have substantially the appearance shown. Successive spirals are secured to each other by suitable bonding material so that the final product is a substantially integral tubular outer covering around the core 107. The fibrous core may be formed by twisting paper continuously and at a suitable point where rotary motion is being applied thereto, and after all the twisting action has occurred, a ribbon of paper may be fed at an angle to the twisted and rotating body to continuously apply this spiral covering.

The adhesive by which successive spirals are bonded are brushed or deposited onto the ribbon as it is being fed to the core. The ribbon may be previously gummed and the gum moistened by passing it in contact with an aqueous medium before it is spiraled onto the core. As the article is being completed it is delivered along in a straight path until the adhesive is set and thereafter it is cut successively into sticks of the desired length. The resulting article involves an outer tubelike structure which causes the entire body to resist bending under the ordinary conditions incident to the manufacture and use of the confection but which collapses or breaks down when abnormal stress is applied thereto.

It will be noted in Fig. 26 that a plurality of spirals are used, one upon the other. The successive spirals may, under some circumstances also be oppositely wound over the core, the number of spirals and the relations of the winding operations forming the spirals depending, to a considerable extent, upon the characteristics of the paper employed.

Fig. 27 shows an embodiment including an outer tubular structure 109 formed of paper convolutely wound upon a core 110. The tapered portion 111 may be formed by employing a sheet of paper of trapezoidal shape.

In the Fig. 28 embodiment the outer tubular structure 112 is formed of material which acts somewhat as a cement or a plastic, taking a set, upon the application of moisture or heat, or setting because of chemical changes which take place within the material after it is compressed and formed around the core 113. The latter may be of twisted fiber, twine or some other yieldable fibrous body.

In the process of manufacturing such embodiment, the pulp may be deposited onto a porous belt or screen. When the excess moisture has been removed from the pulp it is shaped by successive operations into the form of a tube extending around the core 113. Since the pulp is in loose condition and still contains a relatively large amount of moisture, there is a bonding action between the fibers of the pulp and the substantially continuous and seamless outer tubular structure is formed. By employing suitable pressure conditions, and by the use of suitable dies, a moderately rigid rodlike structure is formed having the stick characteristics which have previously been indicated.

It is also within the scope of the invention that such an embodiment as that shown in Fig. 28 may be formed without using the core 113. However when this core is used in connection with the use of pulp, there is, in the completed product, a substantially continuous outer tubular surface which imparts sufficient rigidity and strength to a core to prevent the ultimate product from bending under ordinary conditions.

In Fig. 29 the stick consists of a twisted fiber formed by treating a ribbon of suitable paper. In this case the twisted strand is relatively thick, and it is treated with an adhesive or bonding agent and then passed through a die or otherwise treated so that the successive spirals of adhesive bond successive paper spirals on the extreme outside surface of the body to form a continuous tubelike outside portion.

According to one method of manufacturing similar confection products, the sticks are fed from a hopper and fed into slots in a forming roller with the ends of the sticks projecting into die cavities in the roller. A coacting roller having complementary die cavities is so timed with reference to the movement of the first roller that the two die cavities will be brought together around the ends of the sticks. Before the die sections close, candy in hot condition is delivered between the die sections, and the continuous operation of the rolls forms the candy about the ends of the sticks.

Excessively flexible sticks cannot be usually employed with equipment operating according to the method just specified because the ends of the sticks will spring away from the candy and will become lodged next to the outside surface of the composite die cavities. Sticks constructed in accordance with my invention, however, can be used in conjunction with such equipment without modification of the apparatus and the illustrative sticks will not be ruptured by pinching pressure which is sometimes applied by such equipment at portions of the stick adjacent the parts which enter the edible bodies. Accordingly, the number of defective products will be decreased, and in this respect my stick offers a substantial advantage over the use of the ordinary wooden stick.

A considerably large number of confections, such as candy, frozen confections such as ice cream, and the like, are attached by suitable operations, which will be referred to hereinafter, to a supporting stick. It has long been customary to use a stick made of wood and all of the automatic machinery and manufacturing production systems have been developed around the use of a wooden stick.

Stick confections are consumed almost entirely by children and it has been well known for a number of years that injury may result to a child by falling with the stick in its hand or mouth; in fact, relatively frequent cases of injury are well known. The possibility of injury has been considered so great in some localities that laws and ordinances have been enacted prohibiting the sale to children of candy or other confections having a wooden stick support.

In the development of a form of support for utilization in place of the customary wooden stick, attention has been given not only to the character of the product when completed, but to manufacturing and assembly processes for producing both the supporting member and the final combination with the confection. Some forms of support have been suggested which are relatively inexpensively made and which from the standpoint of injury are relatively safe; but the types of support suggested heretofore have been objectionable in many other respects.

According to the general principles of my invention, I use a stick or support which is relatively stiff and will have advantageous characteristics under normal conditions incident to the manufacture, storage, sale and consumption of the confection; but which, if given a sharp end blow, will readily collapse without splintering. The stick or support of my invention in function has many of the advantages of a properly seasoned wooden stick insofar as its normal use is concerned. It has in general, however, the characteristics of a "green" stick insofar as its breaking action is concerned, in that it will bend in the manner in which a "green" stick fractures without splintering, but at the same time with a definite break or point of collapse. It may be further described as a relatively rigid stick having a decreased resistance to breaking when a stress is applied to it with a consequent factor of safety insofar as its penetrating into body tissues is concerned. It has ample resistance to bending and breaking when it is being inserted into the confection and when the confection is being held by the person consuming it; but not sufficient strength to resist the pressure necessary to cause the insertion of the end thereof into body tissues.

An illustrative embodiment of stick or support of my invention is fabricated principally from fiber of the character ordinarily used in paper. It may be built up in several ways, but at all times a common characteristic is maintained, namely, that the outer surface is continuous, thereby producing a tubular portion resistant to bending; and in addition, a sufficient proportion of the fibers run generally longitudinal of the stick to impart sufficient longitudinal strength to resist bending or breaking at relatively low stresses. In a preferred form of the invention, a substantially integral tubular structure is provided, produced either by processing previously produced paper to form the tube; or by employing paper pulp, in which case the tubular paper support is formed directly from the pulp. Several modifications of the invention are possible, while at the same time employing in each case the essential principles hereinabove outlined.

Now referring to Fig. 21, I show a confection comprising a support 101 and an edible solid mass of candy 102 carried on the support 101 by being molded or shaped around the end thereof in the customary manner. The manner in which this stick is produced is somewhat clear by an examination of Fig. 22 wherein the outer paper is shown loosened at the end. The paper is wound volute fashion and in such a manner that cross sections taken various places through the tube are identical and are similar in appearance to the ends thereof shown in Figs. 21 and 22. At least the outer convolution terminating in the edge 104 (Fig. 22) is adhesively secured to the convolution immediately below it so as to make a substantially continuous outer tubelike structure. If desired, all of the convolutions may be secured together with an adhesive or bond, but I have found that if a relatively large number of convolutions are employed, it is not necessary to employ an adhesive throughout the convolutions. The natural tendency of the paper to unroll tends to cause the inner convolution to remain in place, although in some cases, particularly when manufacturing the tube, there is some advantage in employing an adhesive where the innermost convolution engages the next adjacent convolution on the outside.

In forming the structure shown in Figs. 21 and 22, various methods may be used. I find that I can fit the paper into a forming lip which produces a small, substantially cylindrical fold at the edge of the paper. When the paper is thereafter delivered to a point between two belts moving in opposite direction, it is caused to be rolled up about the first convolution so as to produce the final structure shown in Figs. 21 and 22. The adhesive may be applied automatically during the rolling operation by a simple mechanism.

The adhesive employed may be one which is water insoluble or sufficiently resistant to moisture so that it will not be affected by either the moisture in the confection, the moisture in the air, or body moisture, during consumption. Animal glue such as casein and bone glue can be used satisfactorily. I may employ spirit soluble glues such as some of the cellulose derivatives, taking care, of course, that no objectionable solvent is employed; or, if a solvent having a distinct odor or taste is used, the last traces thereof should be removed by evaporation before the stick is used in the confection. I may also employ adhesive substances such as certain of the condensation products which set by the action of heat. In this case, the sticks are run continuously through a heated die to cause the adhesive to set. I have found that the stick of the present invention if made from certain types of papers need not be treated to waterproof it before using it with the confection. I have found, however, that in general it is preferable to employ a thin coating of a suitable innocuous waterproofing substance. I may use various types of materials for this purpose. Innocuous oils, fats and waxes having little or no unsaturated fatty acid content can be used with good results. Straight chain hydrocarbon compounds can also be used. In general, I prefer to use a waterproofing material having a melting temperature above body temperature and above maximum summer heat. Liquid oils which contain a proportion of unsaturated fatty acids may be treated by hydrogenation to suit them for my purpose. Hydrogenated cotton seed oil having a melting temperature of approximately 140° F. can be used. When the waterproofing material has a melting temperature above ordinary room temperature, it is preferably heated sufficiently to melt it before being used for the treatment of the paper.

In Figs. 23 and 24, I show a simple modification similar to that shown in Figs. 21 and 22 with the exception that a mandrel is employed. Looking at Fig. 23, the numeral 106 indicates the supporting stick on the end of which is carried the confection 107. A center mandrel 104 is provided around which the paper is rolled. In Fig. 24, the mandrel is extended to show it more clearly.

Although any suitable type of mandrel may be used, the mandrel shown in Fig. 24 is a relatively small diameter, fibrous strand, preferably an ordinary grade of twine. In using a mandrel of this kind, substantially the same method for rolling the paper may be employed as in the first described embodiment. When using the mandrel, a slight modification in the process is utilized to keep the mandrel from turning with respect to the paper. By employing very small wire with a mechanism similar to that used in the ordinary office clipping or wire stapling machine, the strand which is to make up the mandrel can readily be stitched at one or a plurality of places to the extreme edge of the paper. This paper is preferably given an initial curvature at the edge by passing it under a curled forming lip.

After the mandrel has been secured to the edge of the paper and that edge prepared for rolling around the mandrel by an initial forming operation, the paper is rolled around the mandrel by a simple mechanism such as the two belts described above, moving in opposite direction with the paper between them. A single moving member may be employed for the rolling operation with one stationary surface against which the paper is rolled. When making the supporting stick shown in Figs. 23 and 24, the bonding material may be applied in the same way as in the first described form and the same types of waterproofing materials and other methods of treatment may be used.

In Fig. 25, I show the same general type of support including a rolled paper body 105 of generally cylindrical shape and a strand, or mandrel 106. This type of strand consists of a continuous strip of paper between one and one-half and three inches wide, depending upon the thickness of the strand, collapsed upon itself and twisted to form a substantially solid, flexible strand. Ordinarily, there is approximately one complete twist per linear inch of the strand. The structure is loose, however, in that the strand is readily untwisted by hand to recover the ordinary paper strip from which the strand is made. This material, although possessed of fair tensile strength does not resist bending and so when used alone in its normal condition, it is not satisfactory for several reasons. In the first place, it cannot be used with ordinary equipment now employed and it does not form a sufficiently rigid support for the confection. The outer tube 105 produces a sufficiently rigid structure so that the final stick is substantially unyielding under ordinary conditions; but it will break or collapse when more than a predetermined stress or strain is applied to it. The form of stick shown in Fig. 25 is produced in substantially the same manner as the stick shown in Fig. 24 including the bonding and waterproofing steps of the process. It will be understood that in actual practice, the mandrel is cut off even with the ends of the tube.

The form of the stick shown in Fig. 26 is similar to that shown in Fig. 25, except that a modified method is employed for producing the outer strengthening tube. The inside mandrel 107 is of suitable twisted fiber, preferably the same as that described in connection with Fig. 25, but the outer wrapper 108 is spiraled on so as to have substantially the appearance shown in the drawing. Successive spirals are secured to each other by suitable bond such as animal or vegetable glue, cellulose derivatives, substantially water insoluble alkali silicates, and the like, so that the final product is substantially a tubular outer covering with the inner mandrel 107 filling the tube. The tube may be secured by an adhesive to the mandrel, although with a tight engagement this is not entirely necessary.

Several different simple ways of producing the article shown in Fig. 26 may be used. For example, paper may be twisted continuously to produce the twisted fiber mandrel and at a suitable point along the twisted mandrel where rotary motion is being applied thereto and after all of the twisting action has occurred, a ribbon of paper may be fed at an angle to the twisted and rotating body to continuously apply the spiral covering. The adhesive is brushed or deposited onto the ribbon as it is being fed to the mandrel by suitable mechanism. The tape may be previously gummed, and the gum wetted by passing it in contact with an aqueous medium before it is spiraled onto the mandrel. As the general cross sectional structure of the article is completed, it is delivered along in a straight path until the adhesive is set, and thereafter by suitable mechanism, is cut successively into sticks of the proper length. The resulting article has substantially the same properties and characteristics as the sticks heretofore described. There is an outer tube or tubelike structure which resists bending under ordinary conditions incident to the manufacture of the confection and use thereof; but which breaks down when a greater stress or strain than normal is applied to it. It will be noted that in Fig. 26 a plurality of spirals are used, one upon the other. Any suitable number of spiraled layers may be used, by applying them successively and preferably by making successive spirals overlapping each other. I may, however, employ a single spiral too, with good results.

Fig. 27 shows a stick similar to that pictured in Fig. 24 including a tube 109 formed of paper convolutely wound around a mandrel 110. A tapered portion 111' is provided, this being formed by employing a sheet of paper of trapezoidal shape instead of rectangular shape wherein the two ends are parallel with one side forming a right angle with the two ends and the other side forming an acute and obtuse angle, respectively, with the innermost edge and outermost edge. The same general forming principles are employed as in previous embodiments, using the mandrel in substantially the same way as previously described in connection with the other embodiments.

In Fig. 28, I show a style of support having a tube 112 formed of pulp and a mandrel 113. The mandrel may be twisted paper fiber, twine or some other yieldable fibrous body. The outer portion is formed from pulp by a process similar to that used in making paper.

According to the preferred process to be employed, the pulp is deposited onto a porous belt or screen as in the ordinary paper making process, except that the ribbon is relatively narrower so that only the proper amount of pulp is deposited to be used in the formation of a tube of the size desired. When the excess moisture has been removed from the pulp, it is shaped up by successive operations into the form of a tube extending around the mandrel.

Since the pulp is in a loose condition and still contains a relatively large amount of moisture when it is formed around the mandrel, there is a bonding action between the fibers of the pulp and a substantially continuous tube without seam is formed. By employing proper pressure conditions and the use of suitable dies, a relatively stiff rodlike structure is formed having substantially the same characteristics as the support described in connection with Fig. 23, for example. One difference is that the pulp forms its own bond and the tube is homogeneous throughout instead of having a number of convolutions, as in the previously described form.

While this form will also resist bending, it will at the same time be broken when a stress or strain is applied thereto greater than that to be expected from the normal and intended use to which it is put. I show the mandrel 113 projecting at the end, but it will be understood that when the stick is cut into sections of the proper length, the mandrel also will be cut through so that the appearance of the end of the stick will be as shown at the left-hand side of the figure. When the stick has been completed, it may be treated to waterproof it by the use of waterproof agents such as those described. It may, however, be formed of a pulp so treated that when afterward processed, sufficient water resisting qualities will be present without using a separate waterproofing step.

It should be understood that I may form a body of pulp to have the same exterior shape and all the properties and characteristics of that shown in Fig. 28 without using a mandrel. The principal advantage of the mandrel is that certain steps of the process are simplified somewhat. I have found, however, that I may shape the pulp into the form of a substantially solid rod which can be used with good advantage in the practice of my invention. In this connection, it is to be noted that even when a solid rod of formed pulp is used, the same principle holds, namely, that there is an outer substantially continuous surface which imparts sufficient rigidity and strength to prevent the support from bending or breaking under ordinary conditions; but which permits such support to break without splintering and, so, without danger when sufficient pressure is applied to the end thereof to penetrate body tissue.

In Fig. 29 I show still another modification. The support there shown comprises a twisted fiber formed by treating a ribbon of suitable paper in substantially the same manner as described in connection with the mandrel used in the embodiment of Fig. 25. In this case, however, the twisted strand is relatively thicker and is treated with an adhesive or bonding substance either before or after it is twisted and passed through a die or otherwise treated so that the adhesive seals together successive folds or twisted portions on the extreme outside of the body whereby to make a continuous tubelike outside portion having substantially the same characteristics as described in connection with the other embodiments hereinabove. In order to make a comparison, attention is directed to the fact that in those forms shown in Figs. 21 to 25, inclusive, the outer tubular portion comprises a continuous layer of paper or a series of convolutions of paper, but in any case the paper is continuous. In the spiraled form in Fig. 26, the tube is also continuous but is made continuous by having successive helices or spiral sections of paper bonded together by an adhesive, thus resulting again in a continuous tube structure.

In the form shown in Fig. 29, the outside sections of paper comprise individual spiraled sections of relatively narrow cross section, partly overlapping each other and in part merely abutting each other. When an adhesive secures these overlapping sections or abutting sections together, the final result is also a tube. It is to be understood that some of the adhesive or bonding material will also extend to the inside of the body; but due to the manner of formation, a greater proportion of the adhesive will tend to be driven to the outside and function in the manner described to cause a continuity to exist in the extreme outside portion. I therefore do not limit myself to a structure in which the adhesive is applied only to the extreme outside portion; but there should be sufficient adhesive on the outside portion to produce the continuous structure desired.

The type and amount of adhesive should be such as to avoid the formation of too rigid a body. The form of the invention shown in Fig. 29 can also be made continuously and subsequently cut up to sticks of proper length. The product may be waterproof as in previous embodiments, but it should be understood that in the present as well as in previous embodiments, both the adhesive and waterproofing materials should be selected so that the latter will not cause a deterioration or dissolving action on the adhesive.

The sticks of my invention can be incorporated with the edible portion of the confection in the same manner as that employed on ordinary wooden sticks. According to one method, the confection, either candy or ice cream or the like, is first molded to suitable shape and the stick inserted by placing it endwise into the preformed confection. This is done as a rule with automatic machinery which is more or less standard in the industry. The sticks of my invention will resist breakage sufficiently for insertion in this manner. In cases where there is considerable resistance to the insertion of the stick, it may be protected by gentle pressure against the side walls and this can be done by a very simple modification in standard equipment.

According to another method, the sticks are fed from a hopper and dropped into slots on a forming roller with the end of the stick projecting into a die cavity in the roller. A coacting roller having a complementary die cavity is timed so as to bring the two die sections together around the end of the stick. Before the die sections close, the candy in a hot condition is delivered between the die sections and the continuous operation of the rolls forms the candy about the end of the stick. A flexible stick cannot be employed with equipment operating according to this method, because the flexible end of the stick will spring away from the candy and will become lodged next to the outside surface instead of imbedded in the center of the candy. The sticks of my invention, however, can be fed to machines operating in this manner without modification of the machine. When wooden sticks are employed on this type of equipment, a pinching pressure is sometimes applied to the stick where it enters the candy due to an improper feeding or adjustment of some of the moving parts. This causes the fibers of the wooden stick to crack and splinter, thereby producing a defective product which cannot be merchandized. The stick of my invention under these conditions will not be ruptured, although the side walls may be slightly indented. Accordingly, the number of defective pieces will be decreased and in this respect my stick offers an advantage over the ordinary wooden stick.

In order to make an attractive display of stick confections, it has been suggested that sticks be colored. No support for a confection heretofore used within my knowledge can be colored with satisfaction. A pigment or stain can be imparted to wooden sticks, for example; but the final appearance of such colored stick is unsatisfactory because the color is flat. The stick could be enameled to produce a bright appearance, but this is unsatisfactory both from the standpoint of cost and sanitation. The stick of my invention can be made from a glazed colored paper which can be finished with a bright color and have an attractive and pleasing appearance. From the standpoint of eye appeal, definite advantages therefore flow from the use of my invention.

In the form of the invention in which the outer portion of the stick is produced by spiraling a ribbon of paper onto a fibrous mandrel, the successive spirals are shown as slightly overlapping each other so that secured together with a bond they form a continuous tube. It will be understood that the degree of overlapping is subject to modification; indeed when more than one spiral layer is employed, the successive spirals, instead of overlapping each other, can have their edges in abutting contact. In this case, the next successive spiral will overlap two spiral sections below it and by the use of an adhesive will cause the lowermost spirals to be bonded together.

I have described my invention in detail so that those skilled in the art will understand various manners in which the same may be practiced. Where I use the terms "stick" and "support," it is understood that I use them in the meaning that these terms would normally have in the context in which they are used. In the claims, I employ the term "rod" for the purpose of designating the general character of the support, but it will be understood that the term "rod" is not limited to a solid body or a body of any definite shape or size except insofar as the claim itself limits and defines the meaning of the term.

Another advantage of the present invention is the simplicity and ease with which printed matter can be applied to the stick. The paper may be printed cheaply before it is formed, so that when the stick is completed, the printing appears in the proper place or places on the outside of the completed product. This avoids a separate operation, such as is necessary when a wooden stick has printed matter applied thereto.

While I have described my invention with reference to the details of certain embodiments thereof, it is to be appreciated that the invention is not to be considered as limited to all of the details thereof. It is rather to be taken as of such a scope as that indicated by the subjoined claims.

What I claim as new and desire to protect by Letters Patent of the United States is:

1. A substantially solid and homogeneous rodlike body for supporting in an upright position a confection externally mounted thereon, said body consisting wholly of a single rolled up sheet of paper of a width as great as the length of the body and tightly wound upon itself in a plurality of continuous overlying convolutions, the inner convolutions being unbonded to one another whereby the resistance to deformation of the interior of the body is substantially equal only to the aggregate strength of the unbonded convolutions plus their mutual re-enforcement and whereby when broken, to present a relatively soft interior, and an adhesive bond uniting only a few of the outer convolutions whereby to form a relatively thin, hard, absorption resistant, cylindrical outer shell normally holding the inner convolutions in tightly wound condition, the resistance of which to deformation is greater than of a corresponding number of unbonded convolutions but which, when buckled under the force of impact greater than the force resulting normally from use with automatic machinery for installing a confection thereon, but less than that encountered in falling or the like accident by the consumer of the confection, releases the inner convolutions whereby to render the body readily bendable and breakable about the point of buckling.

2. A substantially solid and homogeneous rodlike body for supporting in an upright position a confection externally mounted thereon, said body consisting wholly of a single rolled-up sheet of sized paper of a width as great as the length of the body and tightly wound upon itself in a plurality of continuous overlying convolutions, the inner convolutions being unbonded to one another whereby the resistance to deformation of the interior of the body by endwise pressure is substantially equal only to the aggregate strength of the unbonded convolutions plus their mutual re-enforcement and whereby when broken, to present a relatively soft interior, and an adhesive bond uniting only a few of the outer convolutions whereby to form a relatively thin and hard, absorption resistant cylindrical outer shell normally holding the inner convolutions in tightly wound condition, the resistance of which to deformation is greater than that of a corresponding number of unbonded convolutions but which, when buckled under the force of endwise impact greater than the force resulting normally from use of the rodlike body with automatic machinery for installing a confection thereon, but less than that encountered in falling or the like accident by the consumer of the confection, releases the inner convolutions whereby to render the body readily bendable and breakable about the point of buckling.

SOL DECKER.